Figure 1:
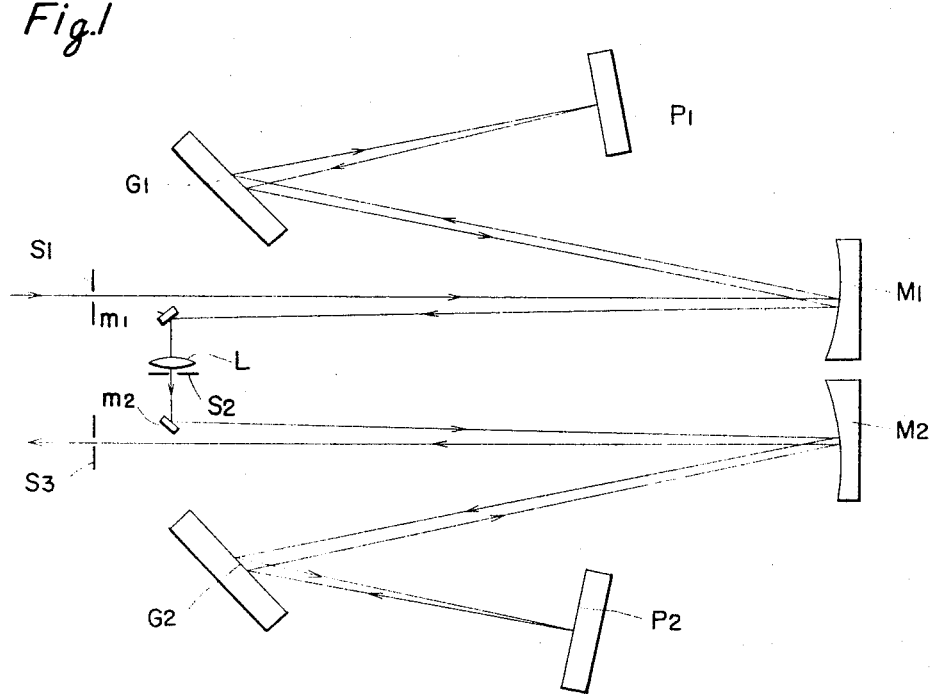

United States Patent [19]
Shimomura

[11] 3,749,498
[45] July 31, 1973

[54] DOUBLE-PASS TYPE DOUBLE MONOCHROMATOR

[75] Inventor: Teiichi Shimomura, Kyoto, Japan

[73] Assignee: Shimadzu Seisakusho Ltd., Kyoto City, Japan

[22] Filed: Feb. 25, 1971

[21] Appl. No.: 118,614

[30] Foreign Application Priority Data
Feb. 25, 1970 Japan....... 45/18559 (utility model)

[52] U.S. Cl.................................. 356/101, 350/294
[51] Int. Cl............................. G01j 3/06, G01j 3/18
[58] Field of Search................ 356/99–101; 350/294

[56] References Cited
UNITED STATES PATENTS
2,741,941  4/1956  Madsen et al. ................. 356/101 X
3,069,966  12/1962  White ............................. 356/100
2,871,757  2/1959  Walsh ............................. 356/99 X
3,418,051  12/1968  Staunton......................... 356/101
2,922,331  1/1960  Fastie et al. .................... 356/99
2,945,953  7/1960  Martin ............................ 356/101 X
3,069,967  12/1962  White et al. .................... 356/100

Primary Examiner—Ronald L. Wibert
Assistant Examiner—F. L. Evans
Attorney—Craig and Antonelli

[57] ABSTRACT

The present invention is to provide a double-pass type double monochromator having a high resolving power and an improved relative speed. To this end, there is provided an improved optical system in which the number of times light passes through the light dispersing element is doubled only with the provision of inexpensive reflector elements.

4 Claims, 3 Drawing Figures

3,749,498

INVENTOR
TEIICHI SHIMOMURA

BY Craig, Antonelli, Stewart & Hill
ATTORNEYS

DOUBLE-PASS TYPE DOUBLE MONOCHROMATOR

The present invention relates to a spectroscopic measurement system and, more particularly, to an optical system of the character adaptable in monochromators, especially a double monochromator.

It has been well known that the double monochromator is generally used for spectroscopic measurement. As compared with a spectroscope, the monochromator has an advantage in that a narrow portion of the spectrum can be produced and, in general, it comprises a light dispersing element such as a prism or a diffraction grating.

A double monochromator heretofore largely available comprises at least one collimating element and a pair of light dispersing elements, these elements being arranged such that rays of light passing through an entrance slit are transmitted to one of the light dispersing elements by means of the collimating element and in turn, the dispersed light is transmitted to the other dispersing element by means of the same collimating element whereby a monochromatic spectral line can be obtained through an exit slit. In this instance, each light dispersing element is adapted to receive an incident ray of light one time. (Accordingly, such a double monochromator is particularly called a single-pass type double monochromator.)

However, recently, it has become necessary to spectro-analyze rays of light passing through the entrance slit at which the light intensity is very low. Accordingly, the present invention has for its object to provide an optical system for use in a monochromator by which the degree of dispersion is so high that an improvement can be made in the resolving power.

Another object of the present invention is to provide an optical system for use in a monochromator which can be simply arranged without necessitating any expensive elements.

A further object of the present invention is to provide an optical system for use in a monochromator which can be advantageously employed in any conventional double monochromator at low cost without necessitating a complicated modification.

A still further object of the present invention is to provide an optical system for use in a monochromator of the type above referred to by which the relative speeds of monochromator can be advantageously improved.

A still further object of the present invention is to provide an optical system for use in a monochromator which can be manufactured in compact size without reduction of the performance of the monochromator proper.

According to the present invention, the optical system for use in a monochromator so far described comprises a pair of light dispersing elements and the corresponding number of light reflecting elements, these elements being arranged such that each of the light dispersing elements can receive a ray of light two times to thereby improve the resolving power of the instrument. Accordingly, the instrument embodying the present invention may be possibly said to be a double-pass type double monochromator.

Figure 2:
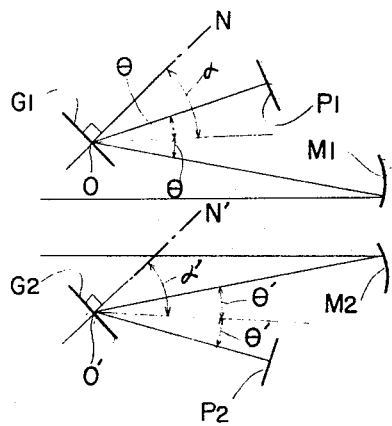
Figure 3:
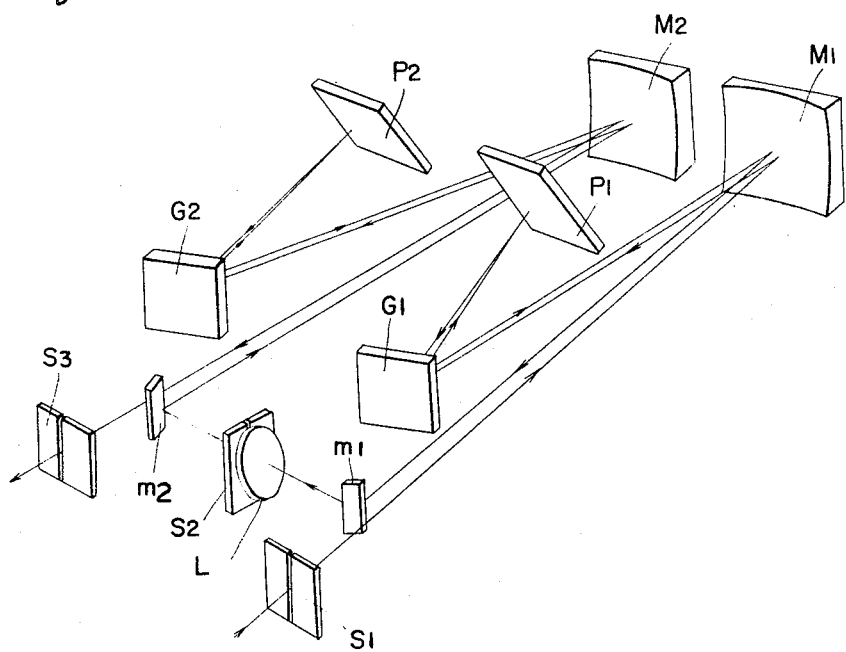

These and other objects and features of the present invention will become apparent from the following description taken in conjunction with preferred embodiments of the present invention with reference to the attached drawings only for the purpose of illustration thereof, in which;

FIG. 1 is a schematic diagram of an optical system according to the present invention, FIG. 2 is an enlarged diagram of a portion of the optical system shown in FIG. 1 for better understanding of the principle of the present invention, and FIG. 3 is a perspective view of a modified optical system according to the present invention.

Referring now to the attached drawings, it is to be noted that all of the elements shown are arranged on a mounting bench of any known construction which is herein omitted.

The double monochromator in general comprises a pair of optical units which are symmetrical in an optical sense, but need not always be symmetrical in the sense of geometry, with respect to each other.

The optical system for use in the double monochromator of the kind above referred to comprises an entrance slit member S1 of any known construction disposed in alignment with a suitable light source (not shown) through which rays of light from the light source are projected on a first collimator element M1 forming an image of the slit structure thereon. The collimator element M1 acts to make the rays of light thus projected thereon parallel and reflect the parallel rays of light onto a first light dispersing element G1 which, in the instance as shown, is a diffraction grating.

The parallel rays of light projected on the first grating G1 can be dispersed according to wavelength and only one ray of light having a specific wavelength which has been thus dispersed is adapted to be reflected toward a plane reflector element P1. The ray of light of a specific wavelength thus reflected by the reflector element P1 is again dispersed by the diffraction grating G1 and then travels toward the first collimator element M1, and is in turn transmitted toward an intermediate slit member S2 of any known construction or of the same construction as that of the entrance slit member S1 via a field lens L by means of a suitable light deflecting element m1.

It is to be noted that, since the same elements m2, M2, G2, P2 and S3 as employed in a portion above the chain line shown in FIG. 1 are disposed also in the other portion below the chain line, the ray of light passing through the intermediate slit member S2 can be transmitted to the exit slit member S3 substantially in the same manner as hereinbefore described in connection with the rays of light passing through the entrance slit member S1. However, it is to be noted that the diffraction gratings G1 and G2 are arranged in parallel relation with respect to each other. In addition, it is preferable to position each of the plane reflector elements P1 and P2 which may be in the form of plane mirrors in close vicinity of the corresponding diffraction gratings G1 and G2, but may be designed such that they can be adjustably displaced with respect to the respective gratings G1 and G2. If the reflector P1 or P2 is positioned in the close vicinity of the grating G1 or G2, some possible influence of stray light can be prevented.

In the arrangement as hereinbefore described, it can be considered that the diffracted ray of light transmitted from the diffraction grating G1 is mixed with other rays of light which have been merely reflected by the diffraction grating G1 without being transmitted to the plane reflector P1. However, since such rays of light have wavelengths different from that of the diffracted ray of light so that, even if they pass through the intermediate slit member S2 onto the other diffracting grating G2 via the collimator element M2, transmission of these rays of light to the exit slit member S3 and/or to the other plane reflector element P2 from the grating G2 can be advantageously prevented. In other words, only the light ray reflected by the reflector element P1 can be transmitted to the exit slit member S3 through the remaining optical elements. The manner in which this can be achieved will be hereinafter described with reference to FIG. 2.

In FIG. 2, it is assumed that light rays reflected by the collimator element M1 are projected on the grating G1 at an angle $(\alpha + \theta)$ with respect to the grating normal ON, from which a light ray of specific wavelength emerges at an angle $(\alpha - \theta)$. In this case, the light ray of a specific wavelength transmitted via the intermediate slit member S2 by means of the collimator element M2 can be projected on the grating G2 at an angle $(\alpha' - \theta')$ with respect to the grating normal O'N' since gratings G1 and G2 are disposed in parallel relation with respect to each other as hereinbefore described. Accordingly, no rays of light other than that of the specific wavelength can emerge from the exit slit member S3. In this connection, it is to be noted that, in the instance as herein described, each value of the angles $\theta$ and $\theta'$ is preferably in range of not more than 20°.

In the case where wavelength scanning is to be performed, it is only necessary to rotate both gratings G1 and G2 in synchronism with each other in the same direction while each grating surface is directed to the corresponding plane reflector element P1 or P2. This can be achieved by connecting both gratings G1 and G2 by means of a suitable parallel link structure.

According to the present invention, the angular dispersion D in terms of (rad./A) can be expressed by the following equation;

$$D = (2n)/d \, [((1)/\cos(\alpha + \theta) + 1/\cos(\alpha - \theta))]$$

where n is the number of passage of the light rays through the light dispersing element and $d$ is a grating constant.

The value of the angular dispersion $D_1$ of the known Littrow type monochromator can be expressed by the following equation;

$$D_1 = n/(d \cos\alpha)$$

or the value of the angular dispersion $D_2$ of the conventional single-pass type double monochromator can be expressed by the following equation;

$$D_2 \approx 2n/(d \cos\alpha)$$

However, since the angle $\theta$ or $\theta'$ is in practice so small that it can be neglected, the following relation can possibly be established:

$$D \approx 2D_2 \approx 4D_1$$

In other words, the angular dispersion $D$ of the instrument incorporated with the optical system of the present invention is approximately two times that of the conventional single-pass type double monochromator or four times that of the Littrow type monochromator.

Although the both preferred embodiments of the present invention shown in FIG. 1 and FIG. 3 comprise the same number of like elements, the difference therebetween resides in that all of the elements shown in FIG. 1 are mounted on the same plane while that of FIG. 3 are disposed in three dimensions. In either case, the same angular dispersion $D$ can be obtained without any reduction.

Although the present invention has been fully described in conjunction with the preferred embodiments thereof, it should be noted that various modification and change are apparent to those skilled in the art, such modification and change being construed as falling in the scope of the following claims.

What is claimed is:

1. An optical system for use in a monochromator comprising:
   an entrance slit member, disposed adjacent a suitable light source, for permitting the passage of light therethrough;
   first means, disposed at a first predetermined position with respect to said entrance slit, for receiving the light rays passing therethrough and for collimating said received collimated rays in a first predetermined direction;
   a first light dispersing element having a grating surface disposed to receive the light rays collimated by said first means and to disperse the received collimated rays in a second direction according to wavelength;
   a first reflector element positioned to reflect a predetermined ray of light included in the light dispersed by said first light dispersing element and to return the reflected dispersed light onto said first light dispersing element;
   an intermediate slit member disposed to permit passage of the predetermined ray of light which has been transmitted thereto by way of said first light dispersing element and said first means;
   second means, disposed at a predetermined position with respect to said first means, for receiving the light rays passing through said intermediate slit and for collimating the light rays passing through said intermediate slit in a third predetermined direction;
   a second light dispersing element having a grating surface disposed to receive the light rays collimated by said second means and to diffract the predetermined ray of light transmitted in a fourth direction according to wavelength;
   a second reflector element positioned to reflect the predetermined ray of light diffracted by said second dispersing element and to return the reflected diffracted light onto said second light dispersing element said first and second reflector elements being fixed, respectively, and said first and second dispersing elements being rotated to perform wavelength scanning in synchronism with each other in the same direction while each grating surface of the dispersing element is directed to the corresponding reflector element; and
   an exit slit member disposed to permit passage of the predetermined ray of light which has been transmitted thereto by way of said second dispersing element, said second reflector element and said second means.

2. The optical system according to claim 1, wherein said reflector elements are positioned in the close vicinity of the corresponding dispersing elements.

3. The optical system according to claim 2, wherein said reflector elements can be adjustably moved to and fro with respect to the corresponding dispersing elements.

4. The optical system according to claim 1, wherein said first and second means comprise at least two collimator elements.

* * * * *